Figure 1:
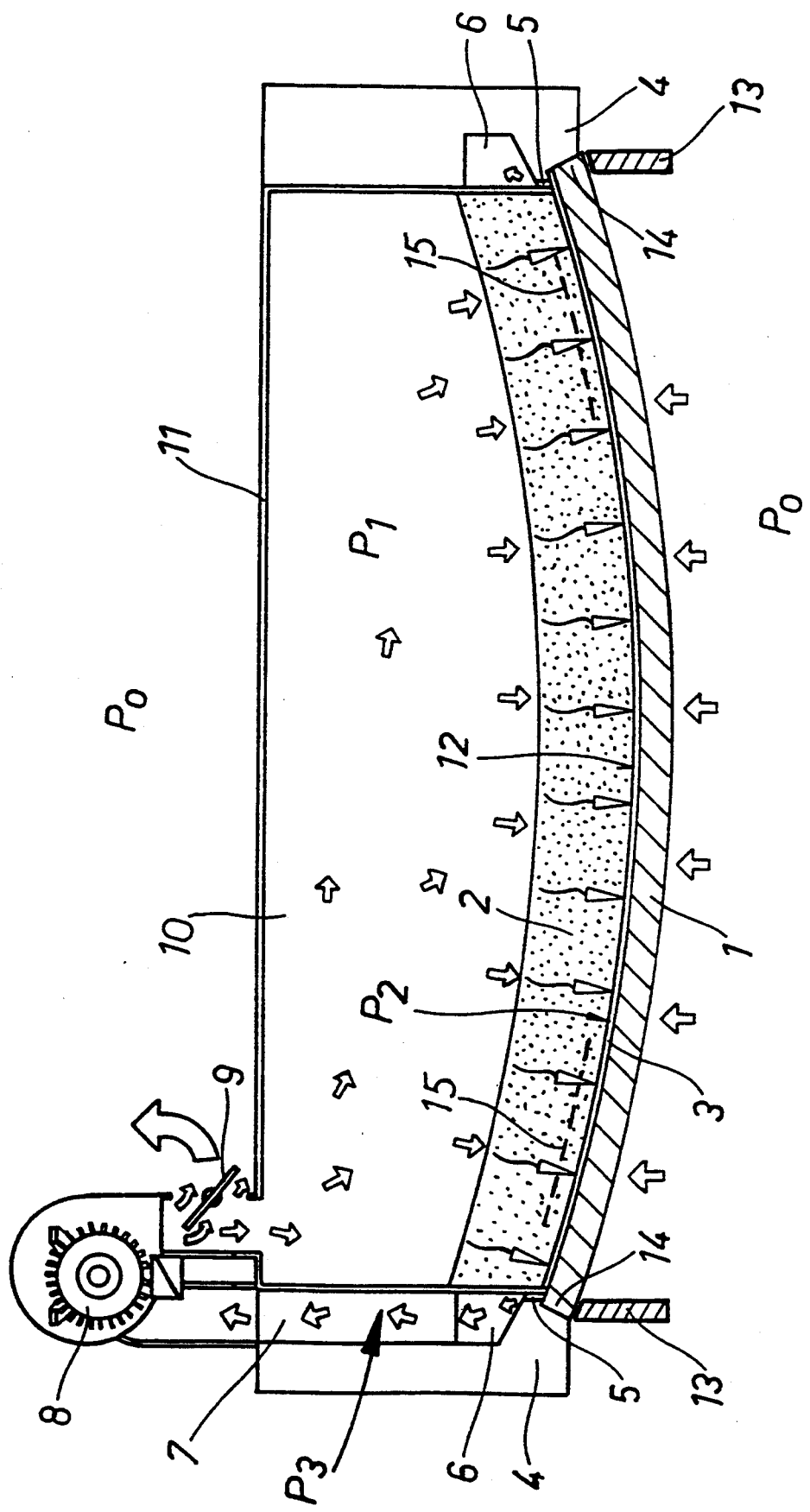

United States Patent [19]

Montonen

[11] Patent Number: 5,383,947
[45] Date of Patent: Jan. 24, 1995

[54] PRESS-BENDING METHOD AND APPARATUS FOR BENDING GLASS SHEETS

[75] Inventor: Jori Montonen, Tampere, Finland

[73] Assignee: Tamglass Engineering Oy, Tampere, Finland

[21] Appl. No.: 59,602

[22] Filed: May 12, 1993

[30] Foreign Application Priority Data

May 27, 1992 [FI] Finland ................. 922447

[51] Int. Cl.⁶ .......................................... C03B 23/035
[52] U.S. Cl. ...................... 65/25.4; 65/106; 65/182.2; 65/287; 65/289
[58] Field of Search .............. 65/25.2, 25.4, 106, 65/182.2, 287, 289, 273

[56] References Cited

U.S. PATENT DOCUMENTS 3,223,443 12/1965 Mission .................. 65/25.2
4,615,724 10/1986 Fackelman .
4,877,437 10/1989 Nitschke .
5,079,931 1/1992 Lehto et al. .

FOREIGN PATENT DOCUMENTS 0277683 8/1988 European Pat. Off. .

Primary Examiner—Joye L. Woodard
Attorney, Agent, or Firm—Burns, Doane, Swecker & Mathis

[57] ABSTRACT

The invention relates to a press-bending method and apparatus for bending glass sheets. The press bending is effected between an upper curved mold surface (12) and a lower ring mold (13). Air is blown through pores included in an upper mold (2) into a space (3) between mold surface (12) and a glass sheet (11), and vacuumed from the edges of the space for developing in the space (3) a negative pressure ($P_2$) capable of bearing a glass sheet (1) in the immediate proximity of the mold surface (12), yet without contacting the mold surface (12).

20 Claims, 3 Drawing Sheets

PRESS-BENDING METHOD AND APPARATUS FOR BENDING GLASS SHEETS

The present invention relates to a press-bending method for bending glass sheets, in which method the bending of a glass sheet is effected on the one hand by using an upper, curved mould surface and, on the other hand, a lower support by means of a ring mold, a gas bed or the like. The invention relates also to a press-bending apparatus for bending glass sheets, said apparatus comprising an upper, curved-surface mould and a lower support element, such as a ring mould for bearing a glass sheet.

Commonly-assigned Patent publications U.S. Pat. No. 5,066,320 and U.S. Pat. No. 5,079,931 disclose a perforated mould provided with blow and suction channels for holding and, if necessary, also for supporting a glass sheet in the immediate proximity of an upper mould surface. Such a double-channeled perforated mould has been found highly functional and capable of bending also complicated bending shapes. However, this prior known mould technique involves certain defects and problems. First of all, the double-channeled mould is quite inconvenient to manufacture and, thus, in view of costs, one and the same mould should be capable of producing long series. Another drawback is the major pressure fluctuation caused by adjacent blow and suction perforations over a short distance. The size and relative disposition of the perforations as well as the distance of a glass sheet from the mould surface are difficult to adjust in a manner that local pressure peaks would not cause deterioration of the optics.

An object of the invention is to provide a press-bending method and apparatus, which has been improved so as to overcome the above problems.

Figure 2:
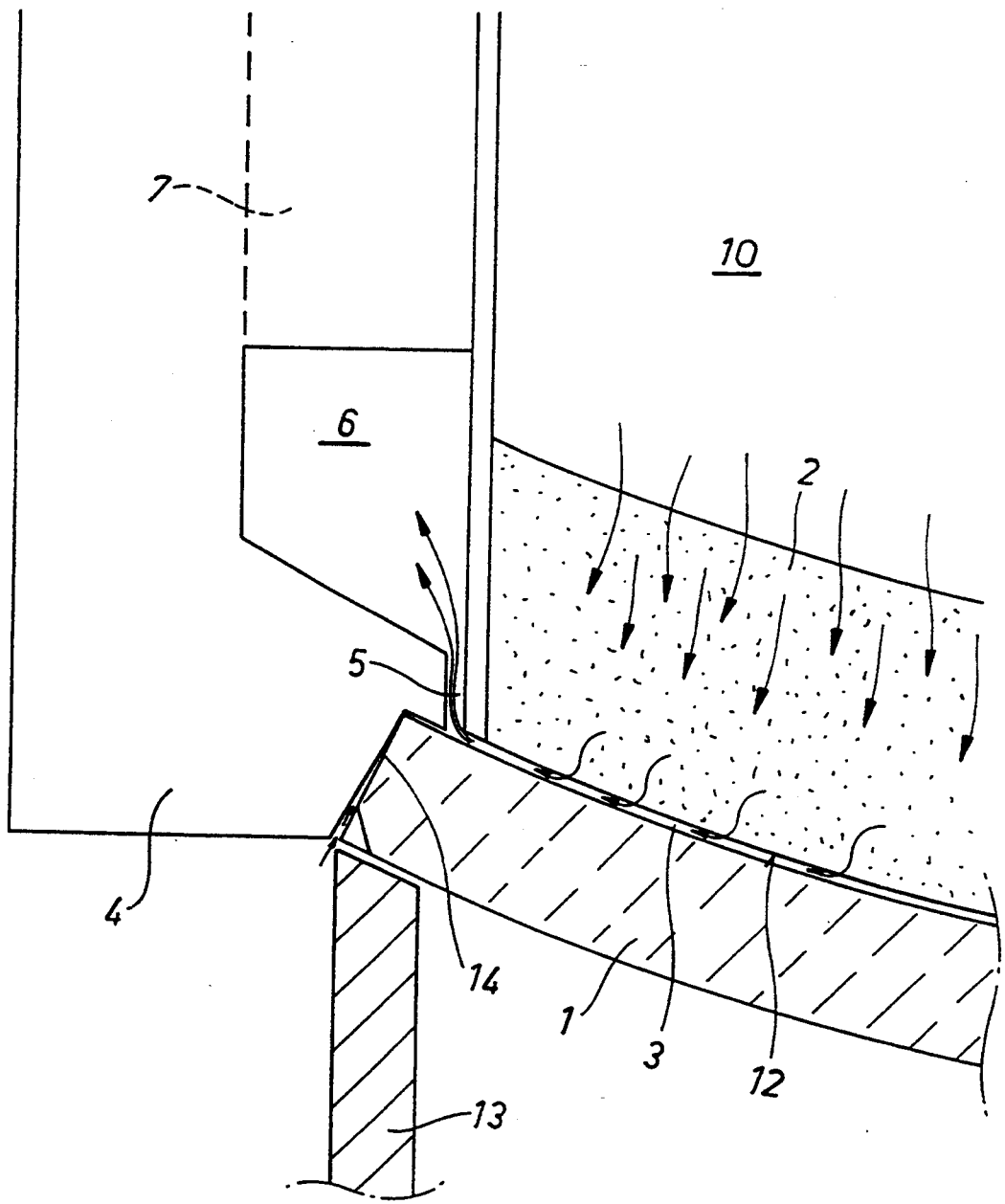
Figure 3:
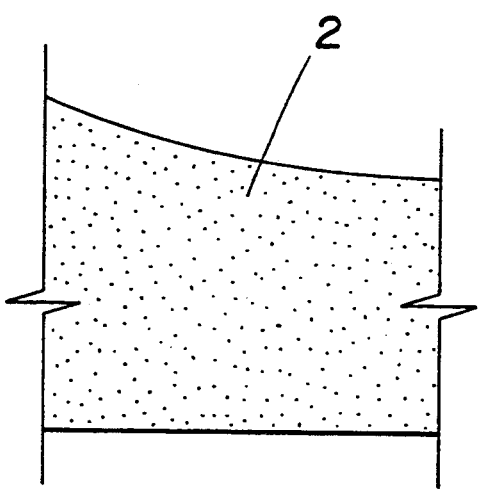

One exemplary embodiment of the invention will now be described in more detail with reference made to the accompanying drawings, in which FIG. 1 shows an apparatus of the invention in vertical section, and FIG. 2 shows an enlarged detail in the same apparatus;

FIG. 3 shows a portion of a mould according to another embodiment of the present invention.

The apparatus includes a mould 2, located above a glass sheet 1, having a curved mould surface 12 which matches a desired bending shape for glass sheet 1. The mould 2 is made of a porous material such that air can be blown through mould the 2 into an interspace 3 between the surface 12 and the glass sheet 1.

The edges of the mould 2 are surrounded by a ring-like wall 4, defining an annular suction port 5 between the wall 4 and the edge of the mould 2. The wall 4 is sealed against a glass sheet edge 14 and/or against a zone adjacent to the edge 14. The narrow annular port 5 opens into a larger annular channel 6 which is connected with a suction channel 7 to the suction port of the fan 8. A channel between the pressure port of the fan 8 and a chamber 10 is provided with an air deflector or damper 9, deflecting some the air coming from the fan 8 to the environment. Just some of the circulation air finds its way into the chamber 10. The chamber 10 is defined by the walls 11 and on one side by mould 2.

Since some of the circulation flow is deflected by means of the damper 9 to the environment, the circulation flow has a static pressure $P_1$, $P_2$, $P_3$ lower than ambient pressure $P_o$. The mould 2 produces a certain pressure loss $P_1$-$P_2$. When pressure difference $P_1$-$P_2$ is selected to be equal to or more than the weight of the glass 1, the mould 2 carries the weight of the glass 1 even though air circulate over the entire surface area of of mould 2, while the suction occurs primarily at the edges of mould 2. Naturally, the mould surface can be provided with grooves joining the suction port 5 and the central area of the mould 2 can also be provided with a larger individual suction port if this is allowed by the glass shape (in other words, glass 1 has no tendency of pressing against the mould surface 12 at this suction port).

Ambient pressure $P_o$ can be substantially equal to normal atmospheric pressure. The invention can be applied particularly in cases where a glass sheet 1 is supported on a ring mould 13 at least at the initial stage of bending. When using a method and mould apparatus of the invention, a glass sheet 1 can be heated throughout to a sufficiently high temperature for bending or tempering. In this case, the negative pressure prevailing in interspace 3 prevents excessive sagging of the central area of the glass sheet 1. If, on the other hand, as mould surface 12 approaches the glass sheet 1, the gap therebetween diminishes beyond a certain critical point, the pressure between surface 12 and glass 1 rises within said area preventing the glass from coming into contact with the mould surface The position of the deflector 9 can be used for regulating a pressure difference $P_o$-$P_2$ for obtaining a desired bearing effect on the glass sheet 1. This pressure difference can be readily brought to a sufficient value for having a glass sheet 1 entirely, without a lower support, carried by the mould 2. However, a lower support is required at the initial stage of bending for bringing a glass sheet 1 close to mould surface 12 and for sealing the edges 14 against wall 4. The complete tightness between the edges 14 and the wall 4 is not required since, despite a certain runoff, a sufficient negative pressure can be produced in the interspace 3 relative to ambient pressure $P_o$.

An essential feature in the invention is that glass 1 is carried partially or entirely by an upper mould surface 12 such that only blowing occurs therethrough. The manufacture of such a mould is very simple since there is no need for parallel double-channeling. Most preferably, the mould can be made of a porous material which allows the flow-through of air without separate perforation. Thus, no local pressure peaks are produced in the interspace 3 over a short distance, either, even when the glass 1 is approaching the surface 12. Thus, the only pressure variations in the interspace 3 are caused by the variations of a gap between the surface 12 and the glass 1. If the surface 12 is provided, e.g., with perforations having a diameter within the range of 1-2 mm, the glass 1 shall is not subjected to pressure peaks if the gap between the surface 12 and the glass 1 slightly exceeds the diameter of the blow perforations. Thus, a pressure peak disperses equally over the glass surface but, if the gap decreases dramatically, the effect of pressure peaks will also increase at the perforations. Thus, this can be completely avoided by using a porous mould structure, wherein the perforations in surface 12 are very small. A porous mould can be manufactured, e.g., such that, during the manufacturing operation, the interior of a mould material (e.g. ceramic mass) is furnished with minute pellets or grains which disappear upon heating (melt and/or gasify). The degree of porosity can be selected by selecting the size and/or amount of pellets or grains. This is an easy way of creating a mould having its degree of porosity vary as desired within various sections of the mould. Thus, it is possible to blow more air through a certain section than through some other section. The perviousness of a mould can also be affected by the mould thickness, which, as seen in FIG. 3 can be made varying as desired within various sections of the mould.

An entire mould assembly of the invention is placed in a hot furnace and temperature of the air to be circulated through the mould corresponds substantially to the bending temperature of the glass 1. It is often necessary to apply heat in a locally varying manner to various sections of the glass. For this local heating the interior of the mould 2 made of a ceramic material can be provided with heating resistances 15, e.g., in the form of a meshed resistance mat. It is possible to employ one or a plurality of individual resistance mat sections 15. Alternatively, the resistance mat 15 can be extended over the entire surface area of the mould 2 and the sub-domains of the resistance mesh mat can be individually switched on and off. In practice, it is generally sufficient to have a possibility of further heating at one or more predetermined spots where a complicated glass bending shape requires further local heating.

While this invention has been illustrated and described in accordance with a preferred embodiment, it is recognized that variations and changes may be made therein without departing from the invention as set forth in the claims.

What is claimed:

1. A press-bending method for bending glass sheets using an upper, curved mould surface formed of a porous material and a lower glass sheet support, the method comprising the steps of:
   blowing air through the mould surface into a space between the mould surface and a surface of a glass sheet over substantially an entire surface area of the mould surface;
   removing air from the space between the mould surface and the surface of the glass sheet adjacent edges of the space by suction;
   adjusting an amount of air removed and an amount of air blown to support the glass sheet relative to the mould surface such that at least a portion of the surface of the glass sheet is disposed at a distance from the mould surface; and
   press bending the glass sheet supported relative to the mould surface.

2. A method as set forth in claim 1, comprising the further step of recirculating at least a portion of the removed air by blowing the portion of the removed air through the mould surface.

3. A method as set forth in claim 1, comprising the further step of heating the air, as it is blown through the mould surface, with one or more heating resistances disposed inside of the mould surface.

4. A method as set forth in claim 1, wherein the mould surface has two or more sections of different porosity and more air is blown through a unit area of a more porous one of the sections than through a unit area of a less porous one of the sections.

5. A method as set forth in claim 1, wherein the mould surface has two or more sections of different thickness and more air is blown through a unit area of a thinner one of the sections than through a unit area of a thicker one of the sections.

6. A press-bending method for bending glass sheets using an upper, curved porous mould surface and a glass sheet support, the method comprising the steps of:
   blowing air through the pores in the mould surface into a space between the mould surface and the glass sheet;
   applying suction to edges of the space between the glass sheet and the mould surface, as air is blown through the pores in the mould surface, to support the glass sheet at a distance relative to the mould surface; and
   press bending the glass sheet supported relative to the mould surface.

7. A method as set forth in claim 6, wherein a portion of the removed air resulting from applying suction is recirculated and blown through the mould surface and another portion of the removed air is deflected out of the recirculated flow such that the recirculation flow has a static pressure which is lower than ambient pressure.

8. A method as set forth in claim 6, comprising the further step of heating the air, as it is blown through the pores in the mould surface, with one or more heating resistances disposed inside of the mould surface.

9. A method as set forth in claim 6, wherein the mould surface has two or more sections of different porosity and more air is blown through a unit area of a more porous one of the sections than through a unit area of a less porous one of the sections.

10. A press-bending apparatus for bending glass sheets, the apparatus comprising:
    an upper, curved mould surface including a plurality of pores;
    a lower support element for bearing a glass sheet relative to the mould surface to define a space between the glass sheet and the mould surface;
    a suction channel at least partially surrounding the mould surface;
    means for blowing air through the pores into the space and for removing air from the space through the suction channel; and
    means for adjusting a relationship between an amount of air removed from the space and an amount of air blown into the space by the means for blowing and removing air such that pressure in the space is lower than ambient pressure.

11. An apparatus as set forth in claim 10, wherein the means for blowing and removing air includes a suction side connected to the suction channel and a pressure side connected to the mould surface so as to define a recirculation circuit, and the means for adjusting a relationship between an amount of air removed from the space and a amount of air blown into the space comprises an air deflector for deflecting air blown by the air blowing and removing means from the circuit to the environment wherein a portion of air removed from the space by the air blowing and removing means is recirculated through the recirculation circuit and blown through the pores and another portion of the air removed from the space is deflected out of the recirculation circuit.

12. An apparatus as set forth in claim 11, wherein a porosity of the mould surface is different in different sections of the mould surface.

13. An apparatus as set forth in claim 12, wherein a mean diameter of the pores is less than 1 mm.

14. An apparatus as set forth in claim 11, further comprising at least one heating resistance disposed inside of the mould surface.

15. An apparatus as set forth in claim 11, wherein a thickness of the mould surface is different in different sections of the mould surface.

16. An apparatus as set forth in claim 10, wherein the suction channel includes an annular suction port at edges of the mould surface.

17. An apparatus as set forth in claim 10, further comprising one or more heating resistances disposed inside of the mould surface.

18. An apparatus as set forth in claim 10, wherein a thickness of the mould surface is different in different sections of the mould surface.

19. An apparatus as set forth in claim 10, wherein a porosity of the mould surface is different in different sections of the mould surface.

20. An apparatus as set forth in claim 10, further comprising means for recirculating at least a portion of the air removed from the space by the blowing and removing means, the recirculated air being blown though the pores by the blowing and removing means.

* * * * *